(No Model.)
S. C. DOANE.
SLEIGH KNEE.
No. 420,407. Patented Jan. 28, 1890.
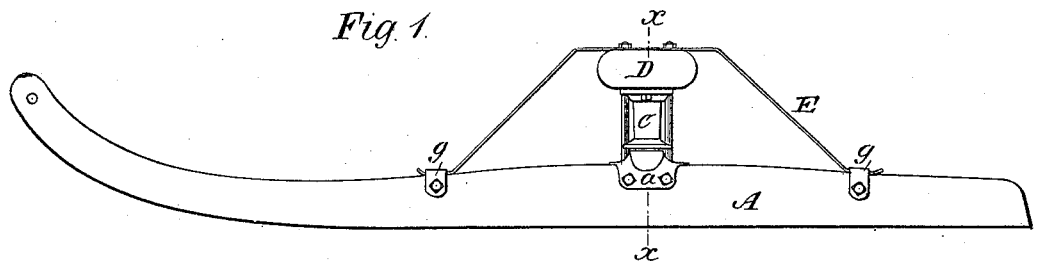
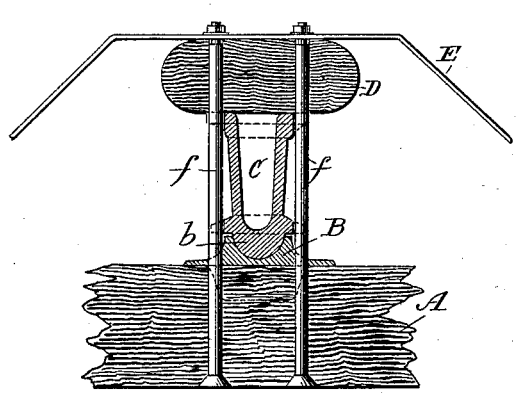
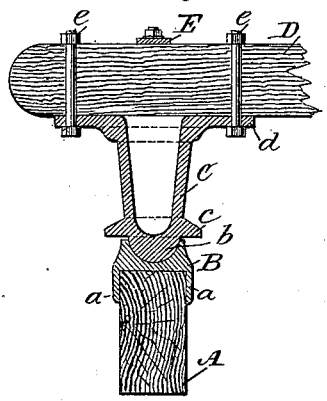
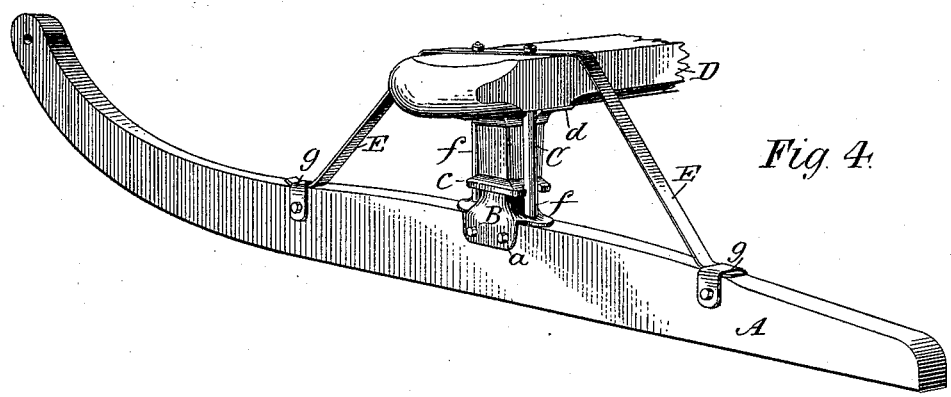
WITNESSES:
Paul Johst
C. Sedgwick
INVENTOR:
S. C. Doane
BY
Munn & Co.
ATTORNEYS.

UNITED STATES PATENT OFFICE.

SETH C. DOANE, OF STEVENS POINT, WISCONSIN.

SLEIGH-KNEE.

SPECIFICATION forming part of Letters Patent No. 420,407, dated January 28, 1890.

Application filed June 22, 1889. Serial No. 315,236. (No model.)

*To all whom it may concern:*

Be it known that I, SETH C. DOANE, of Stevens Point, in the county of Portage and State of Wisconsin, have invented a new and Improved Sleigh-Knee, of which the following is a specification, reference being had to the annexed drawings, forming a part thereof, in which—

Figure 1 is a side elevation of a runner with my improved sleigh-knee attached. Fig. 2 is a longitudinal section of the knee and a portion of the runner. Fig. 3 is a transverse section of the runner and knee, and Fig. 4 is a perspective view of the knee and runner.

Similar letters of reference indicate corresponding parts in all the views.

The object of my invention is to construct a simple and effective device for connecting the runners of sleighs with the sleigh-beams so as to permit of a certain amount of motion of the runner, while securing the requisite strength.

My invention consists in the combination, with the runner and the beam, of a knee provided with a ball-and-socket joint, which forms a connection with the runner, all as will be hereinafter more fully described.

To the sleigh-runner A, which is of the usual form, is attached the cast-iron socket B, provided with flanges $a$, which extend downward a short distance upon opposite sides of the runner, and which are secured to the runner by bolts extending transversely through the flanges and the runner. In the socket B is formed a hemispherical cavity $b$, to which is fitted the hemispherical lower end of the hollow cast-iron knee C. The lower part of the knee C is provided with a flange $c$, which extends over the socket B, and the upper part of the knee is provided with the flange $d$, which is secured to the beam D by bolts $e$. Bolts $f$ extend upwardly through the runner A and through the beam D on opposite sides of the knee C. The flanges of the said knee are notched, and the flange of the socket B is provided with apertures for receiving the bolts F. The rave E extends over the beam D, and its ends are secured to the runner A before and behind the socket B by clips $g$.

By means of my improved construction the sleigh-runners and knees are prevented from being injured by strain, while the runner is allowed to adapt itself to the inequalities of the road.

Having thus described my invention, I claim as new and desire to secure by Letters Patent—

1. The combination, with the runner A and beam D, of the socket B, having flanges $a$ and provided with the spherical cavity $b$, the knee C, having flanges $c$ $d$, and the bolts $f$, substantially as specified.

2. The combination, with the runner A and beam D, of the socket B, having flanges $a$ and provided with the spherical cavity $b$, the knee C, having a spherical end, the bolts $f$, the bolts $e$, and the rave E, substantially as specified.

SETH C. DOANE.

Witnesses:
AUGUST WISLINSKY,
THOMAS H. DAVIES.